United States Patent
Nakano et al.

(10) Patent No.: US 6,934,151 B2
(45) Date of Patent: Aug. 23, 2005

(54) DOCKING STATION

(75) Inventors: Masayoshi Nakano, Machida (JP); Hideyuki Usui, Chigasaki (JP)

(73) Assignee: Lenovo PTE LTD, Singapore (SG)

( * ) Notice: Subject to any disclaimer, the term of this patent is extended or adjusted under 35 U.S.C. 154(b) by 0 days.

(21) Appl. No.: 10/792,471

(22) Filed: Mar. 3, 2004

(65) Prior Publication Data

US 2004/0223293 A1 Nov. 11, 2004

(30) Foreign Application Priority Data

Mar. 7, 2003 (JP) .................................... 2003-062457

(51) Int. Cl.$^7$ ............................................. G06F 1/16
(52) U.S. Cl. ...................... 361/686; 718/322; 710/304
(58) Field of Search .............................. 361/683–687, 361/724–727; 718/300, 322–324; 710/304; 248/552

(56) References Cited

U.S. PATENT DOCUMENTS 6,255,622 B1 * 7/2001 May et al. .................. 219/209
6,309,230 B2 * 10/2001 Helot ......................... 439/131
6,453,378 B1 * 9/2002 Olson et al. ................ 710/304

* cited by examiner

*Primary Examiner*—Hung Van Duong
(74) *Attorney, Agent, or Firm*—Carlos Nunoz-Bustamante

(57) ABSTRACT

As a user depresses an eject button from the standard position to its sunken position and an instruction is transmitted to an installed notebook PC to request the disconnection of a driver for a device being operated in a docking station. When a notification is received from the PC indicating that the disconnection has been completed, for example and not to limit the a solenoid type electromagnetic apparatus switches a plunger to its non-projected position. The eject button is then placed into its projected position owing to the urging force of a spring. When the user depresses the eject button placed in its projected position, a motion direction converting lever is pivoted to activate an ejecting member and a locking hook. Consequently, the PC is ejected.

9 Claims, 11 Drawing Sheets

DOCKING STATION

BACKGROUND OF THE INVENTION

The present invention relates to computing systems in general, and particularly, to a docking station provided with devices which allows a portable computer installed in the station to use these devices. More particularly, the invention relates to a docking station that enables a portable computer to be efficiently ejected.

To eject a notebook type PC (Personal Computer) from a docking station, an OS (Operating System) of the notebook type PC must disconnect drivers for devices used, via the docking station, by the notebook type PC installed in the docking station. This is to prevent the ejected notebook type PC from hanging up. Accordingly, a conventional typical docking station is provided with an eject button and an eject request button. A user first pushes the eject request button. Subsequently, the OS of the notebook type computer completes disconnections and the user is notified of this through a predetermined lamp which is lit on the docking station, an indication on a screen of the notebook type PC, or the like. Then, the user pushes the eject button to remove the notebook type PC from the docking station.

A conventional eject operation in the docking station requires the user to operate the two buttons; the eject request button and the eject button. Furthermore, the user must confirm that the OS of the notebook type PC completes disconnection of the drivers for those devices in the docking station which were in operation, creating a laborious operation.

One purpose of the present invention is to provide a docking station which has a reduced number of components to operate in ejecting the portable computer and which simplifies an eject operation.

SUMMARY OF THE INVENTION

A docking station according to the present invention allows a portable computer to be installed in and removed from the docking station. The docking station is provided with devices that are not provided in the portable computer installed in the docking station. It is kept electrically connected to the portable computer installed in the docking station to make the devices available to the installed computer. The docking station according to the present invention includes the following items:

an ejection operation member operated by a user, a separation apparatus (or a separator) which unlocks the portable computer from the docking station to separate the portable computer from the docking station, a holding apparatus (or a holder) which holds the ejecting operation member at a first position while the portable computer is installed in the docking station, a sensing mechanism which senses when the user's operation causes the ejecting operation member to displace from the first position to a second position different from the first position, an instruction mechanism (or an instruction unit) which, on the basis of the sensing by the sensing mechanism, instructs an OS of the portable computer installed in the docking station to disconnect a driver being used by the portable computer via the docking station, a driving apparatus (or an actuator) which drives the portable computer to a third position different from the first and second positions after the portable computer has notified the docking center that the OS of the portable computer has finished the disconnection instructed by the instruction mechanism, and a control apparatus (or a controller) which activates the separating apparatus when the user's operation causes the ejecting operation member to move from the third position.

The docking station according to the present invention includes combinations of the above docking station with one or more of the technical matters in (a1) to (a8).

(a1) The ejecting operation member is of a type operated using the operator's finger.

(a2) The first position, a finger operation surface of the ejecting operation member is generally flush with a predetermined outer surface portion of the docking station, at the second position, the finger operation surface of the ejecting operation member is sunken into the docking station with respect to the predetermined outer surface of the docking station, and at the third position, the finger operation surface of the ejecting operation member projects outward from the predetermined outer surface of the docking station.

(a3) The positions of the ejecting operation member are defined in the order of the second, first, and third positions in a direction at which the operation member is displaced, the station has an urging member (a spring or the like) that urges the ejecting operation member from the second position to the third position and a locking member (a button lock) that releasably locks the ejecting operation member at the first position, and the holding apparatus includes the urging member and the locking member.

(a4) The control apparatus activates the separating apparatus when the user performs an operation to displace the ejecting operation member from the third position to the second position.

(a5) The locking apparatus includes an electromagnetic apparatus comprising a plunger that can be switched between a projected position and a non-projected position and as topper formed in the ejecting operation member and abutting against the plunger projecting in the displacing direction of the ejecting operation, to hold the ejecting operation member at the first position against an urging force of the urging member.

(a6) The electromagnetic apparatus places the plunger at the non-projected position at which the plunger does not abut the plunger against the stopper when the driving apparatus drives the ejecting operation member to the third position, and the driving apparatus includes the magnetic apparatus and the urging member.

(a7) The separation apparatus is a motion mechanism that moves mechanically in accordance with a transmitted mechanical displacement to separate the portable computer from the docking station, and the control apparatus includes a displacement transmitting mechanism that transmits, to the mechanical motion mechanism, the mechanical movement of the ejecting operation member from the third position to the second position.

(a8) The control apparatus further has a pin which is displaced integrally with the ejecting operation member in the displacing direction of the ejecting operation member and which is displaced relative to the ejecting operation member in a direction (hereinafter referred to as a "first direction") normal to the displacing direction of the ejecting operation member, and a circuiting guide groove that guides the pin in the first direction so that during a movement process in which the ejecting operation member is operated by the user to move from the third position to the second position, the pin carries a predetermined pivoting portion of the displacement transmitting mechanism to transmit the displacement of the pin to the displacement transmitting mechanism, and during other movement processes, the pin leaves the predetermined pivoting portion of the displacement transmitting mechanism so as not to transmit the displacement of the pin to the displacement transmitting mechanism.

The portable computer is typically a notebook type PC but is not limited thereto. It includes an arbitrary computer operated by an OS, e.g. a PDA (Personal Digital (Data) Assistants) and a cellular telephone. Typically, the separation apparatus (the separator) is a pure mechanical motion mechanism (the term "pure mechanical motion mechanism" shall refer to a mechanism including no electric elements) that moves in accordance with the mechanical motion of the ejecting operation member is transmitted via the control apparatus (the controller). However, it may be an electromagnetic actuator operated in accordance with an electric signal from the electric control apparatus. The ejecting operation member is, for example, a push button that is displaced in an axial direction when pushed with, for example, the forefinger. If the ejecting operation member is a push button, the operation surface of the ejecting operation member is a surface spreading in a direction almost normal to the displacing direction of the ejecting operation member. The ejecting operation member is typically disposed on the top surface of the docking station. However, it may be disposed on a side of the docking station. The urging member is, for example, a spring such as a coil spring, or an elastic member. Instead of the electromagnetic apparatus with the plunger, the locking apparatus may include a locking member that can pivot without using the plunger and an electromagnetic actuator that switches the pivoting position of the locking member.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
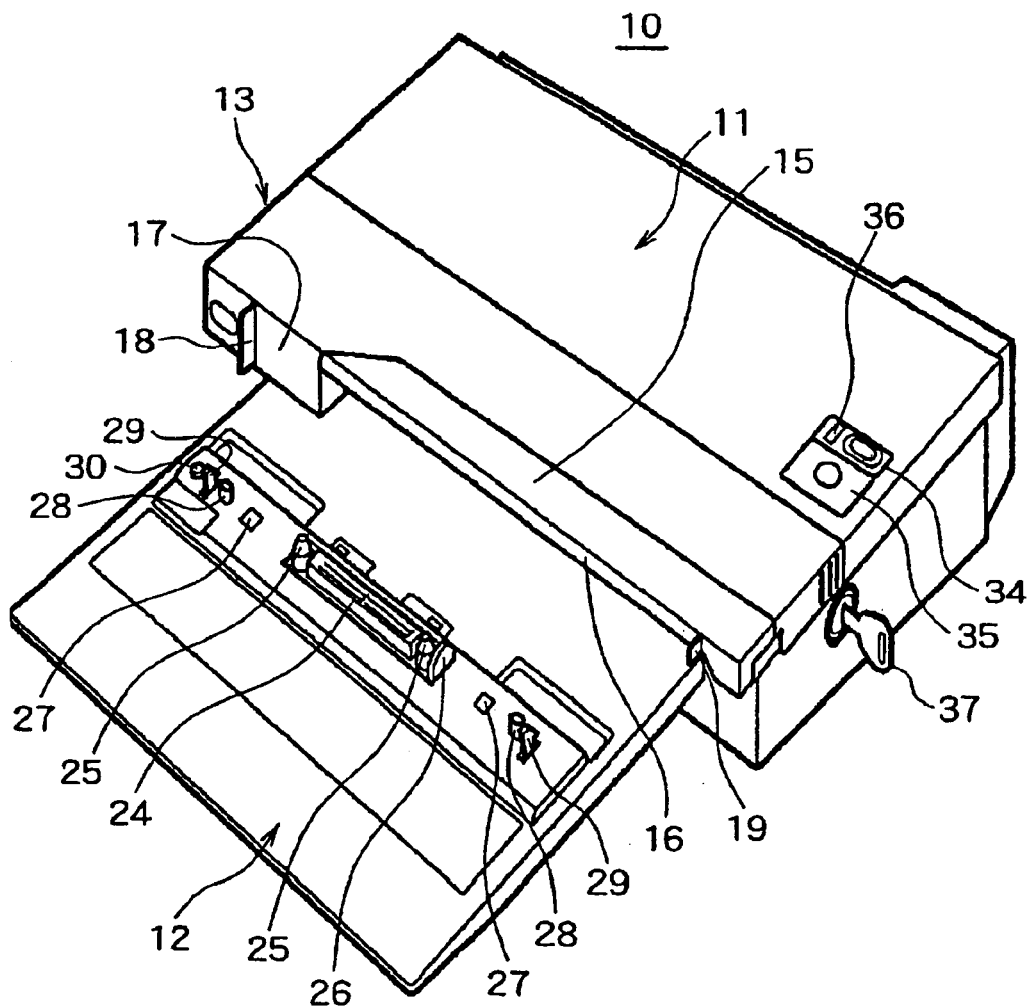
FIG. 1 is a schematic perspective view of a docking station.

Referring now more particularly to the accompanying drawings, FIG. 1 is a schematic perspective view of a docking station 10. In the description of the drawings below, for convenience, the directions in the docking station 10 are defined as described below. A side closer to a user with respect to the docking station 10 is defined as the front, while a side further from the user with respect to the docking station 10 is defined as the rear, when the user installs (docks) the notebook type PC (Personal Computer) in the docking station 10 for use. Likewise, the left side as viewed from the user is defined as the left side, while the right side as viewed from the user is defined as the right side. In FIG. 1, the leftward and obliquely downward direction corresponds to the frontward direction of the docking station 10, and the leftward and obliquely upward direction corresponds to the rearward direction of the docking station 10. Furthermore, in FIG. 1, the leftward and obliquely upward direction corresponds to the leftward direction of the docking station 10, and the rightward and obliquely downward direction corresponds to the rightward direction of the docking station 10. The docking station 10 has a station main body 11 containing devices and mechanical mechanisms, a table section 12 that projects frontward from the front end of the station main body 11, and a movable member 13 having a wall structure and which can be guided by the front end of the outer surface of the station main body 11 so as to move frontward and rearward. The docking station 10 also acts as a port replicator and is provided with various connectors on the rear side (rear surface) of the station main body 11. The movable member 13 has a flap 15 at its front end. The flap 15 can pivot around a laterally horizontal axis at its proximal end. In its horizontal position, the flap 15 has an outer surface side and inner surface side facing upward and downward, respectively. The flap also aligns its outer surface side with top surface of the main body of the movable member 13 in the vertical direction to form almost one plane with the surface of the main body of the movable member 13. Moreover, in the horizontal position of the flap 15, a guide surface 16 as a leading end surface of the flap 15 is almost aligned with a guide surface 17 at the left end of the movable member 13 in a longitudinal direction, to form almost one vertical surface with the guide surface 17. A guide plate 18 projects from the guide surface 17 at a position close to the left end of the table section 12. The guide surface 18 has surfaces facing in a lateral direction. A guide plate 19 projects from the guide surface 16 at a position close to the right end of the table section 12. The guide surface 19 has surfaces facing in the lateral direction. The guide surfaces 16 and 17 guide the rear surface of the notebook type PC when the notebook type PC is installed in the docking station 10. The guide surfaces 16 and 17 thus position the notebook type PC in the longitudinal direction to smooth the installation. The guide plates 18 and 19 guide the rear ends of the right and left sides of the notebook type PC when the notebook type PC is installed in the docking station 10. The guide plates 18 and 19 thus position the notebook type PC in the lateral direction to smooth the installation. In this connection, depending on the type of the installed notebook type PC, the guide plate 18 and/or 19 may not function as a guide because the notebook type PC is too small. When a notebook type PC with a large battery larger than a standard one is installed in the docking station 10, the flap 15 is abutted against the bottom surface of the large battery to pivot around the proximal laterally horizontal axis. The flap 15 is thus brought into a vertical position in which the guide surface 16 faces downward.

A connector 24 is fixed to the top surface of the table section 12 between the longitudinal center and rear end of the table section 12 and slightly closer to the rear end. The connector 24 is shaped like a rectangle that is sufficiently long in the lateral direction compared to its longitudinal dimension. Each electric terminal in the connector 24 is connected to a control circuit or the like in the docking station 10. A pair of connector guides 25, a pressure plate 26, a pair of ejecting members 27, a pair of positioning convex portions 28, a pair of locking hooks 29, and a type detecting convex portion 30 are arranged in a line in the same longitudinal direction as that of the connector 24. For the pair of connector guides 25, the pair of ejecting members 27, the pair of positioning convex portions 28, and the pair of locking hooks 29, the elements of each pair are laterally symmetric. The connector guides 25, the ejecting members 27, the positioning convex portions 28, and the locking hooks 29 are arranged in this order in the lateral direction from the interior to the exterior. The pressure plate 26 is provided only in the right half of the table section 12 and is located to the right of and close to the right connector guide 25. The type detecting convex portion 30 is provided only in the left half of the table section 12 and is located outside the left locking hook 29. The connector 24 can be freely coupled to a connector in a concave in the bottom surface of the notebook type PC (not shown) installed in the docking station 10. The docking station 10 and the installed notebook type PC have their electric terminals connected together owing to the mechanical connection of the connector 24 to the connector in the notebook type PC. When the notebook type PC is installed in the docking station 10, the pair of connector guides 25 fits in corresponding insertion holes in the concave in the bottom surface of the notebook type PC to smooth the fitting between the connector in the notebook type PC and the connector 24. The pressure plate 26 projects from the table section 12. When the notebook type PC is installed in the docking station 10, the tip of the pressure plate 26 abuts against a double hinged shutter present in the bottom surface of the notebook type PC to push the shutter open. The notebook type PC has the connecter inside the shutter, the connector being connected to the connector 24. When the user performs an operation to separate the notebook type PC from the table section 12, a mechanism in the table 12 causes the pair of ejecting members 27 to rise upward to separate the notebook type PC from the table section 12. The pair of positioning convex portions 28 are provided on the table section 12 so as to extend in the vertical direction. When the notebook type PC is installed on the table section 12, the pair of positioning convex portions 28 fits in corresponding concave portions in the bottom surface of the notebook type PC to facilitate the installation of the notebook type PC. When the notebook type PC is installed on and separated from the table section 12, the upper end of the pair of locking hooks 29 pivots in the longitudinal direction. When the notebook type PC is installed on the table section 12, hook portions as locked potions in predetermined concaves in the bottom surface of the notebook type PC abut against and slides downward on the trailing slope portions of the locking hooks 29 to cause the upper ends of the locking hooks 29 to pivot forward. After the locked portions of the notebook type PC have passed over the trailing slope portions of the locking hooks 29, the locking hooks 29 move rearward to lock the locked portions. On the other hand, when the user performs an operation to separate the notebook type PC from the table section 12, the upper end of the table section 12 pivots forward to disengage the lock at the hook portions of the notebook type PC, and at the same time to raise the ejecting members 27 in unison with the locking hooks 29. As a result, the notebook type PC is separated from, i.e. leaves the table section 12.

The docking station 10 can be commonly used in different types of notebook type PCs. For the notebook type PC, the longitudinal dimension between the rear surface of the PC and the connector to be connected to the connector 24 is defined as L. For a type of notebook type PC in which L=L1 (hereinafter referred to as a "large type"), the guide surface 16 and guide plate 18 of the movable member 13 guide the rear side of the notebook type PC at a rear position of the movable member 13. For a type of notebook type PC in which L=L2 (hereinafter referred to as a "small type"), the guide surface 16 and guide plate 18 of the movable member 13 guide the rear side of the notebook type PC at a front position of the movable member 13. That is, the longitudinal dimension between the connector 24 and both guide surfaces 16 and 17 is set on the basis of the rear and front positions of the movable member 13, corresponding to the large and small type of notebook type PCs.

If a large type of notebook type PC is installed, the type detecting convex portion 30 fits in a concave in the notebook type PC and cannot be pushed in the table section 12. On the other hand, if a small type of notebook type PC is installed, the type detecting convex portion 30 abuts against the bottom surface of the notebook type PC and is thus pushed in the table section 12. When the type detecting convex portion 30 is pushed in the table section 12, a predetermined pivoting lever (not shown) in the table section 12 pivots to pull its convex portion, i.e. one end of the pivoting lever, out of a corresponding concave portion in the movable member 13. The movable member 13 is thus moved forward by a forward urging force from a predetermined spring (not shown) to reach its front position.

An eject button 34 and a power button 35 are disposed at the right end of the top surface of the station main body 11. To power on and off the docking station 10, the user pushes the power button 35. To separate the notebook type PC from the docking station 10, the user pushes the eject button 34. A docking enabled status display lamp 36 is disposed on the top surface of the eject button 34. After the notebook type PC has been installed in the docking station 10, once the notebook type PC is enabled to use the functions of the docking station 10, the lamp 36 is lighted. The lamp 36 remains lighted as long as this enabled status lasts. When the user pushes the eject button 34, the docking station 10 issues a request for disconnection of the drivers to the OS of the notebook type PC installed in the docking station 10. Then, when the docking station 10 is notified that the drivers have been completely disconnected, in the docking station 10 according to the present invention, the eject button 34 projects up to a predetermined height (pops up) as described below in detail. A theft prevention key 37 can be freely inserted into a key hole in the right side wall of the station main body 11. The user inserts the notebook type PC into the table section 12 and then rotates the theft prevention key 37 to lock the installation of the notebook type PC. Then, the user pulls the theft prevention key 37 out of the key hole. This prevents a third person from separating the installed notebook type PC from the table section 12 to steal the notebook type PC while the proper user is not around the notebook type PC.

Figure 2:
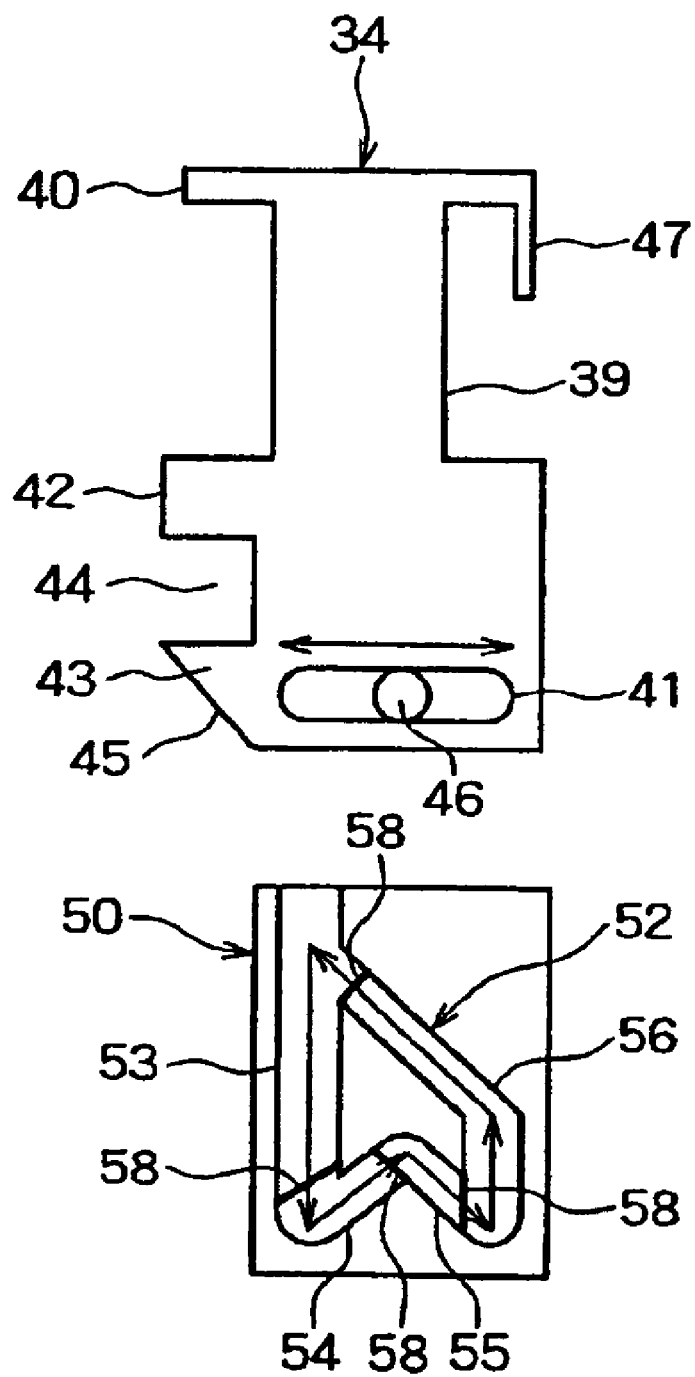
FIG. 2 is a diagram showing an eject button and a cam member separated from each other, as viewed from the cam member in an axial direction of a pin.
Figure 3:
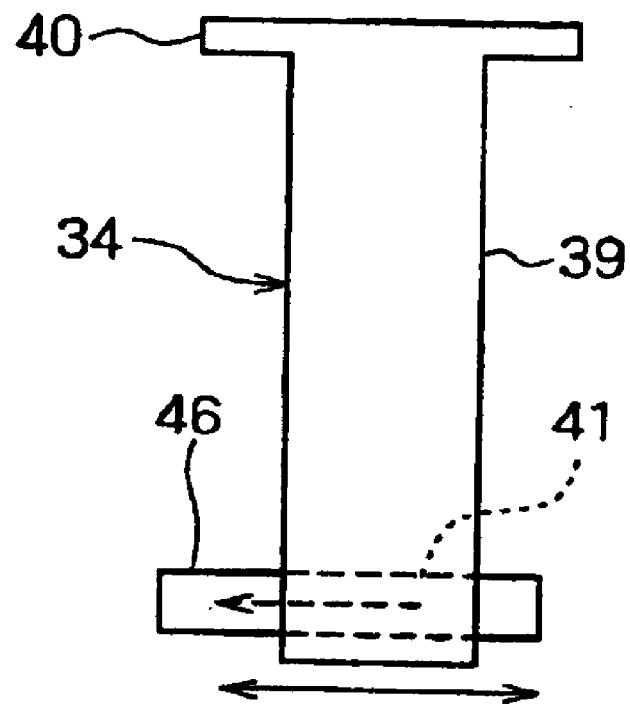
FIG. 3 is a diagram showing the eject button and cam member and a guide member separated from one another, as viewed from the right of FIG. 2.
Figure 3:
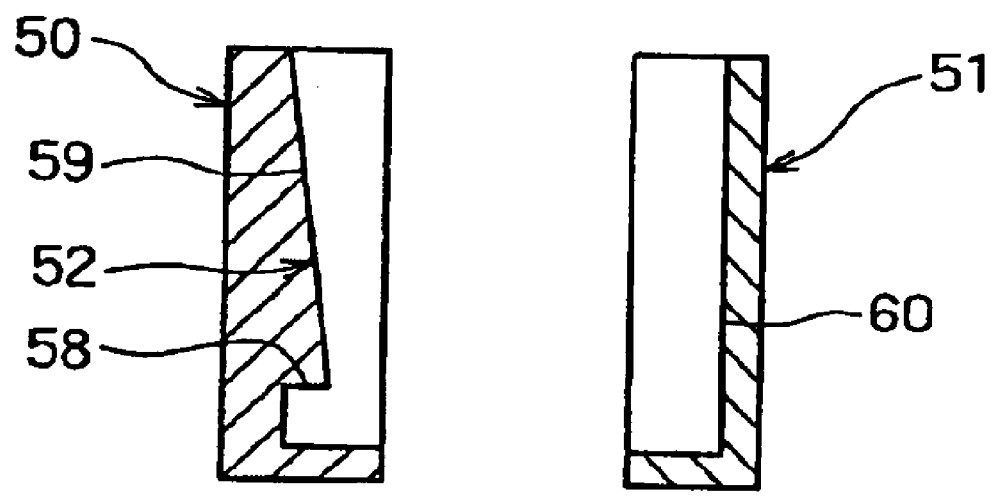
Figure 4:
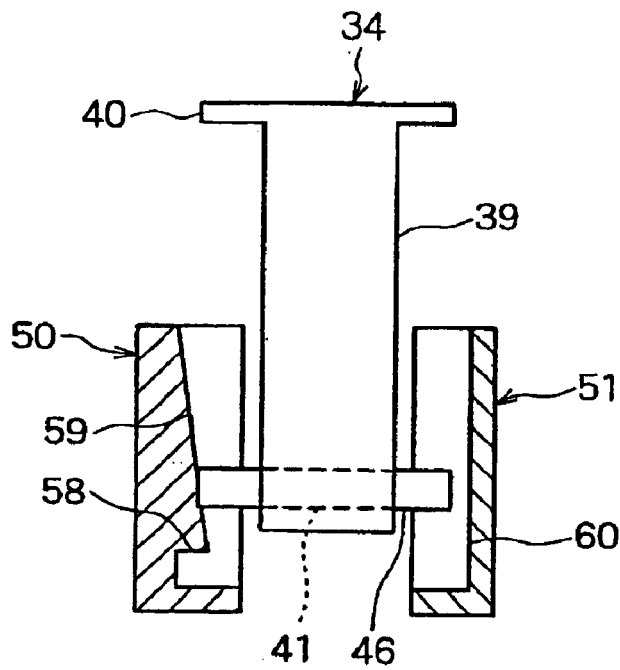
FIG. 4 is a diagram showing the eject button, cam member, and guide member assembled together, as viewed from the same direction as that in FIG. 3.

FIG. 2 is a diagram showing the eject button 34 and a cam member 50 separated from each other, as viewed from the cam member 50 in the axial direction of a pin 46. FIG. 3 is a diagram showing the eject button 34, the cam member 50, and a guide member 51 separated from one another, as viewed from the right side of FIG. 2. FIG. 4 is a diagram showing the eject button 34, the cam member 50, and the guide member 51 assembled together, as viewed from the same direction as that in FIG. 4.

For convenience of description, the vertical direction and lateral direction of FIG. 2 are called the vertical direction and width direction of the eject button 34. Furthermore, the lateral direction of FIG. 3 is called the thickness direction of the eject button 34. In the eject button 34, a stem 39 has a uniform thickness and extends in the vertical direction (FIG. 3). The pressure surface portion is formed in a flange shape on the upper end of the stem 39, and pressed by a user's finger on its top surface. A suspending portion 47 suspends from one end of a pressure surface portion 40 by a predetermined dimension. A slot 41 penetrates the stem 39 at its lower end and extends in the width direction by a predetermined dimension. An upper stopper 42 and a lower stopper 43 are formed at one end of the stem 39 in the width direction and at the lower end of the stem so that the upper stopper 42 is located above the lower stopper 43 with a clearance 44 formed between the stoppers. The upper side of the lower stopper 43 forms a step portion, whereas its lower side constitutes an inclining surface 45 that inclines downward and inward in the axial direction. The axial direction of a pin 46 coincides with the width direction of the eject button 34. The pin penetrates the slot 41 and its opposite ends project from the stem 39.

The cam member 50 and the guide member 51 are arranged opposite each other in the thickness direction of the eject button 34 and across the lower end of the stem 39. A cam groove 52 is formed in a surface of the cam member 50 which is opposite to the guide member 51. The circuiting cam groove 52 extends so as to form a contour like a heart. In FIG. 2, the arrow in the circuiting cam groove 52 indicates the direction in which the pin 46 circuits in the circuiting cam groove 52 or the direction in which the pin advances in each path portion of the circuiting cam groove 52. The circuiting cam groove 52 has a suspending portion 53 that extends straight in the vertical direction, an upward inclining portion 54 that extends obliquely upward from the lower end of the suspending portion 53, a downward inclining portion 55 that extends obliquely downward from the upper end of the downward inclining portion 54, and a bent rising portion 56 that extends upward straight from the lower end of the downward inclining portion 55 by a predetermined amount, then extends obliquely upward, and at its upper end, joins to the upper end of the suspending portion 53. The upward inclining portion 54 and the downward inclining portion 55 form a hollow portion of the heart formed by the heart-shaped circuiting cam groove 52. Each section of the circuiting cam groove 52 has a step portion 58 and a slope portion 59. In each section, in the step portion 58, the depth increases discontinuously. In the slope portion 59, the depth decreases gradually in the direction of the arrows, i.e. the direction in which the pin 46 advances. This depth setting prevents the pin 46 from traveling in the opposite direction in the circuiting cam groove 52. The guide member 51 has a guide groove 60 in its surface that is opposite to the cam member 50, the guide groove 60 having the same shape as the circuiting cam groove 52. The depth of the guide groove 60 is uniform regardless of a position in the groove 60. The width of each of the circuiting cam groove 52 and the guide groove 60 is set to be almost equal to the diameter of the pin 46. As shown in FIG. 4, the cam member 50 and the guide member 51 are opposite to each other across the lower end of the eject button 34. The pin 46 penetrates the slot 41 in the thickness direction of the eject button 34. The opposite ends of the pin 46 are fitted into the circuiting cam groove 52 and the guide groove 60, respectively. The guide member 51 is urged toward the guide member 50 by a spring (not shown). Thus, while circuiting through the circuiting cam groove 52 and the guide groove 60, the pin 46 is displaced in the axial direction in connection with the depth of the circuiting cam groove 52. The pin 46 is thus held in contact with the bottom surfaces of the circuiting cam groove 52 and guide groove 60.

FIGS. 5 to 9 schematically show the relative position relationship between the eject button 34 and its associated elements at respective sequential positions during a motion process of the eject button 34 when the user separates the notebook type PC from the docking station 10. The eject button 34 is arranged in an opening 65 in a housing 64 of the station main body 11 so that the user can push the pressure surface portion 40. The eject button 34 has a standard position (FIGS. 5 and 7) at which the pressure surface portion 40 is at the same level as that of the top surface of the housing 64, a sunken position (FIGS. 6 and 9) at which the pressure surface portion 40 is sunken or collapsed down to a predetermined depth from the top surface of the housing 64, and a projected position at which the pressure surface portion 40 is projected or raised from the top surface of the housing 64. A vertical switch 66 is arranged at a predetermined depth from the opening 65. The vertical switch 66 is on while abutting against the bottom surface of the pressure surface portion 40. It is off while not abutting against the bottom surface. This allows a detection as to whether or not the eject button 34 is at the sunken position. A horizontal switch 67 is attached to the inner surface of the housing 64. The horizontal switch 67 is on while abutting against the suspending portion 47 of the eject button 34. It is off while not abutting against the suspending portion 47. This allows a detection as to whether or not the eject button 34 is at the projected position. Detection values from the vertical switch 66 and horizontal switch 67 enables a detection of the position at which the ejection position is placed, i.e. the standard, sunken, or projected position. The on and off states the vertical switch 66 and horizontal switch 67 at each position of the eject button 34 are as shown below.

| | |
|---|---|
| Standard position of the eject button 34 (FIGS. 5 and 7): | the vertical switch 66 is off, the horizontal switch 67 is on. |
| Sunken position of the eject button 34 (FIGS. 6 and 9): | both vertical switch 66 and horizontal switch 67 are on. |
| Projected position of the eject button 34 (FIG. 8): | both vertical switch 66 and horizontal switch 67 are off. |

A solenoid type electromagnetic apparatus 70 has a plunger 71 that can freely vary the amount by which the eject button 34 is projected. When the plunger 71 is projected toward the eject button 34 by a large amount (this state will hereinafter be referred to as a "projected position" of the plunger 71), it is located in the clearance 44 between the upper stopper 42 and the lower stopper 43 in the vertical direction. When the plunger 71 is projected toward the eject button 34 by a small amount (this state will hereinafter be referred to as a "non-projected position" of the plunger 71), it has been moved out of the clearance 44 in the width direction of the eject button 34. As a result, the eject button 34 can be freely moved in the vertical direction without abutting the upper and lower stoppers 42 and 43 against the plunger 71. The plunger 71 has its axial position supported elastically in the housing of the solenoid type electromagnetic apparatus 70. The plunger 71 can be displaced within a predetermined range by an external force. During a normal period, the solenoid electromagnetic apparatus 70 holds the plunger 71 at its projected position. Before separating the notebook type PC from the docking station 10, the OS of the installed notebook type PC must disconnect the drivers for those devices in the docking station 10 which are in operation, in response to an eject request from the docking station 10. When the installed notebook type PC notifies the docking station 10 that the disconnection has been completed, the solenoid type electromagnetic apparatus 70 switches the plunger 71 from its projected position to non-projected position. The eject button 34 remains urged upward by a spring as an urging member (not shown).

While the user is using the notebook type PC installed in the docking station 10 (FIG. 5), the eject button 34 is at its standard position where the upper end side of the lower stopper 43 abuts against the plunger 71 to hinder the eject button 34 from rising. The pin 46 is at the upper end of the downward inclining portion 55.

Figure 6:
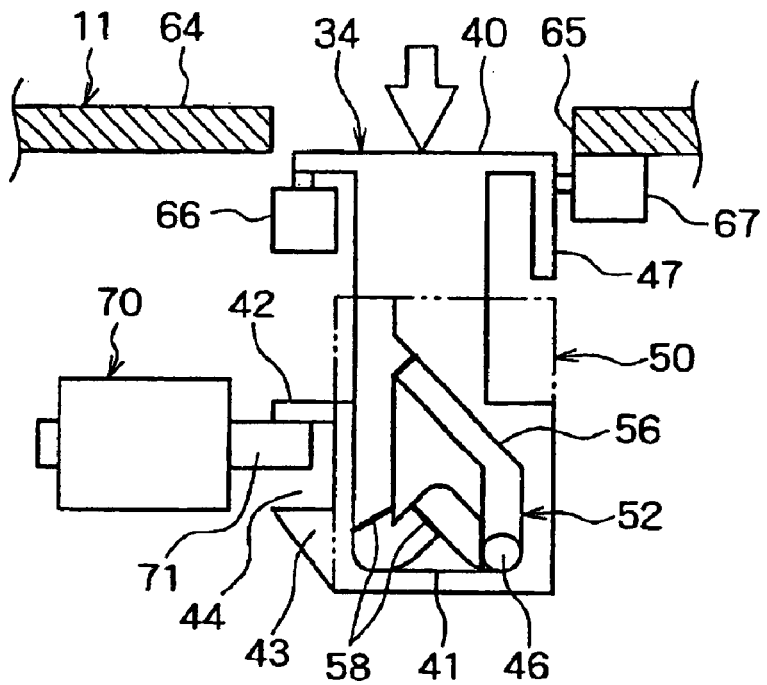
FIG. 6 is a diagram schematically showing the relative position relationship between the eject button and its associated elements at a second position during the motion process of the eject button executed when the user separates the notebook type PC from the docking station.

To separate the notebook type PC from the docking station 10, the user places his or her finger on the pressure surface portion 40 of the engine button 34 to push in the button 34. The upper stopper 42 of the eject button 34 is abutted against the plunger 71 to restrict the further lowering of the button 34. The eject button 34 is thus placed at the specified sunken position (FIG. 6). As the eject button 34 lowers, the pin 46 lowers through the downward inclining portion 55 and climbs over the step portion 58 at the lower end of the bent rising portion 55. The pin 46 is then placed at the lower end position of the bent rising portion 56. When the sunken position is detected on the basis of output signals from the vertical switch 66 and horizontal switch 67, docking station 10 transmits a request for disconnection of the drivers corresponding to those devices in the docking station 10 which are in operation.

Figure 7:
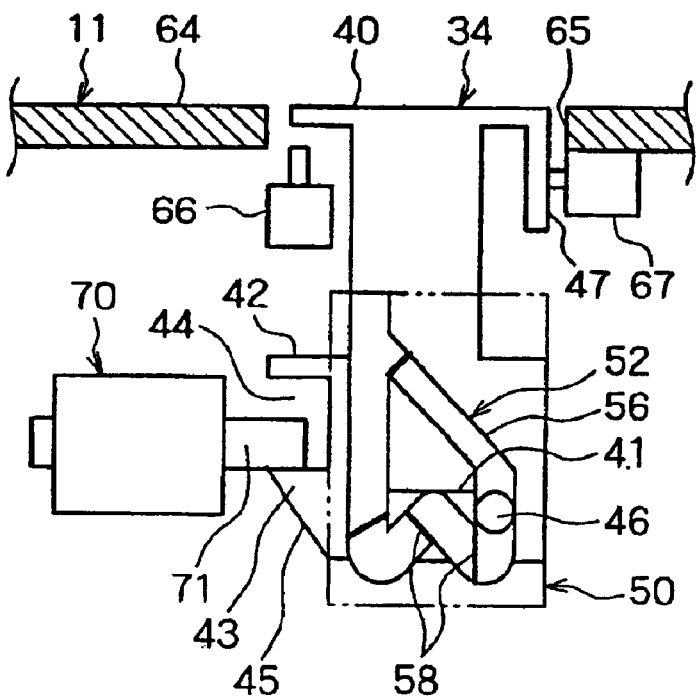
FIG. 7 is a diagram schematically showing the relative position relationship between the eject button and its associated elements at a third position during the motion process of the eject button executed when the user separates the notebook type PC from the docking station.

When the user stops pushing the pressure surface portion 40 with his or her finger, the eject button 34 returns to its standard position owing to the upward urging force of the spring (not shown) (FIG. 7). At the standard position, the pin 46 is maintained at the intermediate position of the bent rising portion 56.

Figure 8:
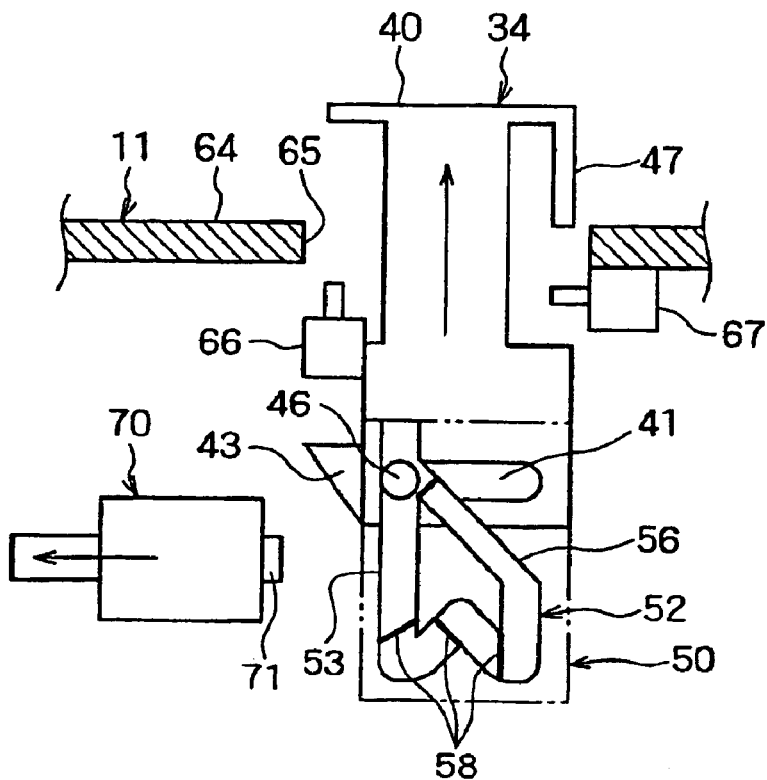
FIG. 8 is a diagram schematically showing the relative position relationship between the eject button and its associated elements at a fourth position during the motion process of the eject button executed when the user separates the notebook type PC from the docking station.

Upon receiving through a terminal in the connector 24 a disconnection instruction for the drivers from an instruction unit (not shown) in the docking station 10, the OS of the installed notebook type PC executes the corresponding process. Upon completing the process, the OS of the notebook type PC transmits an appropriate notification to the docking station 10. When the docking station 10 receives this notification, an electric control apparatus (not shown) of the docking station 10 temporarily switches a control signal transmitted to the solenoid type electromagnetic apparatus 70. The solenoid type electromagnetic apparatus 70 switches the plunger 71 to its non-projected position. As a result, the plunger 71 moves out of the clearance 44 to stop restricting the upward movement of the eject button 34. The eject button 34 is placed at its projected position by the upward urging force of the spring (FIG. 8). The control signal transmitted to the solenoid type electromagnetic apparatus 70 is promptly switched to a normal one. The solenoid type electromagnetic apparatus 70 again returns the plunger 71 to its projected position. When the eject button 34 is placed at its standard position, the pin 46 passes through the step portion 58 at the lower end of the bent rising portion 56. The pin 46 is then placed almost at the upper end of the suspending portion 53.

Figure 5:
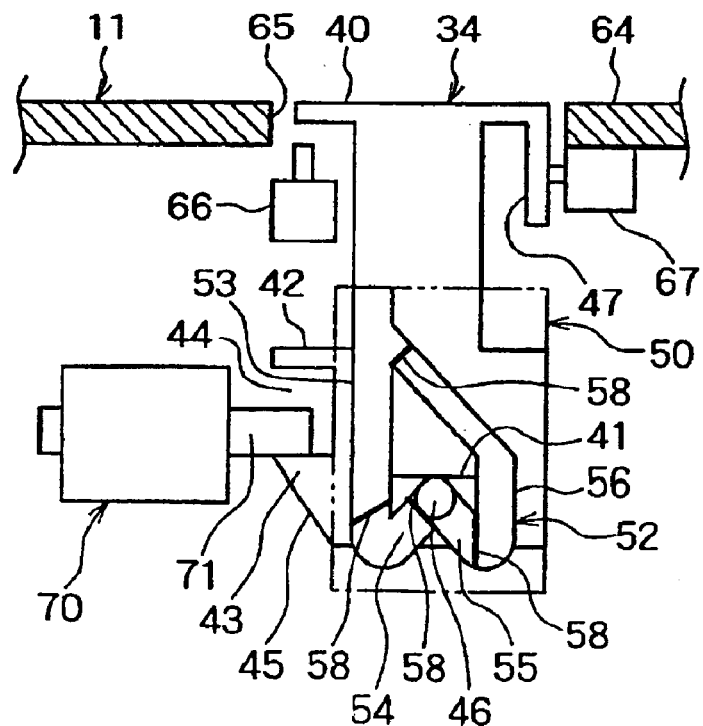
FIG. 5 is a diagram schematically showing the relative position relationship between the eject button and its associated elements at a first position during a motion process of the eject button executed when a user separates a notebook type PC from the docking station.
Figure 9:
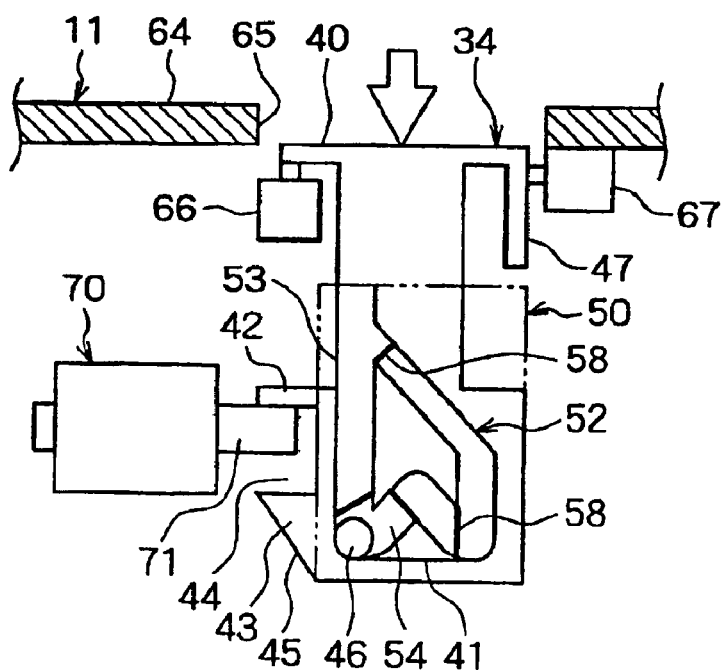
FIG. 9 is a diagram schematically showing the relative position relationship between the eject button and its associated elements at a fifth position during the motion process of the eject button executed when the user separates the notebook type PC from the docking station.

Upon determining that the eject button 34 is placed at its projected position, the user lays his or her finger on the pressure surface portion 40. The user then pushes the pressure surface portion 40 to push the eject button 34 in the housing 64. Although the plunger 71 is at its projected position, its axial position is elastically supported. While sliding on the inclining surface 45 of the lower stopper 43, the plunger 71 receives a force acting in the direction in which the amount of projection decreases. Then, the amount of projection of the plunger 71 decreases. Accordingly, the plunger 71 climbs over the lower stopper 43 and slides in the clearance 44. The plunger 71 then returns to its projected position. The pushing of the eject button 34 in the housing 64 can be continued until the plunger 71 abuts against the upper stopper 42 (FIG. 9). The pin 46 climbs over the step portion 58 at the lower end of the suspending portion 53 and slides in the lower end of the upward inclining portion 54. Subsequently, the eject button 34 is raised by the urging force exerted on it by the spring. The pin 64 is thus placed at the upper end position of the downward inclining portion 55 (FIG. 5).

FIGS. 10 to 13 shows the dynamic state of a motion direction changing lever 74 (the linkage 74) at respective sequential positions during an operation process of the eject button 34 to separate the notebook type PC from the docking station 10. The motion direction changing lever 74 can pivot around a horizontal line using a fulcrum 76, i.e. around an axis normal to the displacing direction of the eject button 34. The motion direction changing lever 74 serves to change the vertical displacement of the eject button 34 to the horizontal displacement of a fulcrum 86 (FIG. 14). The motion direction changing lever 74 is urged counterclockwise in FIGS. 10 to 13 by a spring (not shown) as an urging member. A stopper (not shown) restricts the pivoting of the motion direction changing lever 74 so that the upper side edge of the lever 74 passes beyond a horizontal position of the lever 74 in the vertical direction. When the motion direction changing lever 74 is at the horizontal position, its upper side edge abuts against the pin 46 in the suspending portion 53. The motion direction changing lever 74 is thus carried downward by the pin 46. The state of the motion direction changing lever 74 in FIG. 10 corresponds to the state of the eject button 34 in FIG. 8. The state of the motion direction changing lever 74 in FIGS. 11 to 13 corresponds to the state of the eject button 34 in FIGS. 8 and 9.

Figure 10:
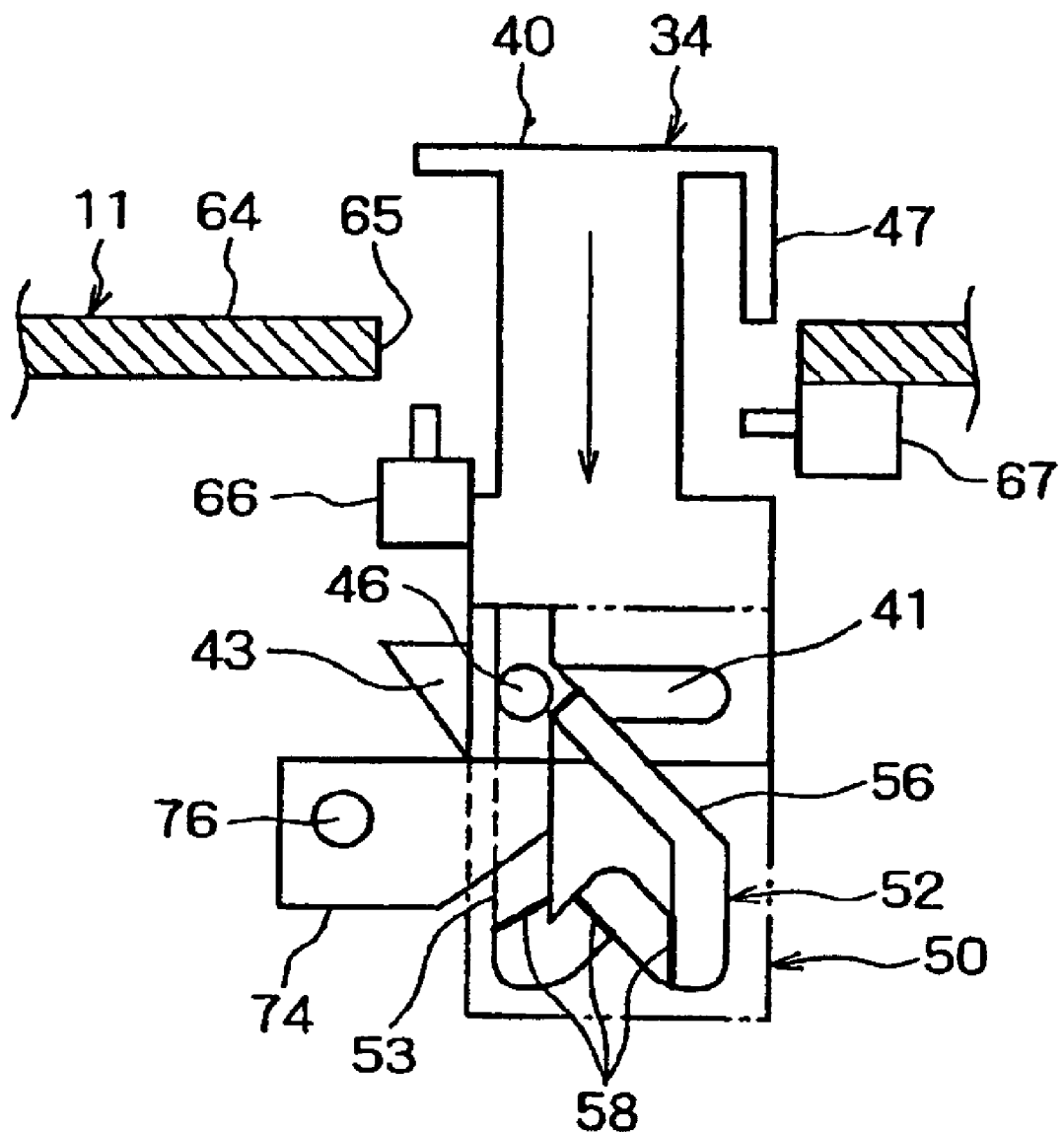
FIG. 10 is a diagram showing a first motion state of a motion direction changing lever during an operation process of the eject button executed to separate the notebook type PC from the docking station.

In FIG. 10, the eject button 34 is at its projected position, with the pin 46 lying at the upper end of the suspending portion 53 of the circuiting cam groove 52. The user finds the eject button 34 at its projected position to determine that the OS of the installed notebook type PC has completely disconnected the drivers for those devices in the docking station 10 which were in operation. That is, the user determines that the notebook type PC may be ejected from the docking station 10. A typical well-known docking station is provided with a display lamp that is lighted when it is notified that the OS of the installed notebook type PC has completely disconnected the drivers for those devices in the docking station 10 which were in operation, in order to inform the user of this. However, in general, when the notebook type PC is separate from the docking station 10, a display panel of the notebook type PC is stood up to make it difficult that the user views the display lamp. Accordingly, the user must change his or her posture by, for example, standing up, in order to view the display lamp. In contrast, with this docking station 10, after pushing the eject button 34 from its standard position to sunken position, the user waits for the disconnection of the drivers to complete while his or her finger on the eject button 34. Upon determining that the eject button 34 is placed at its projected position, on the basis of a change in the position of the finger, the user pushes in the eject button 34. This serves to achieve an efficient and quick ejecting operation.

Figure 11:
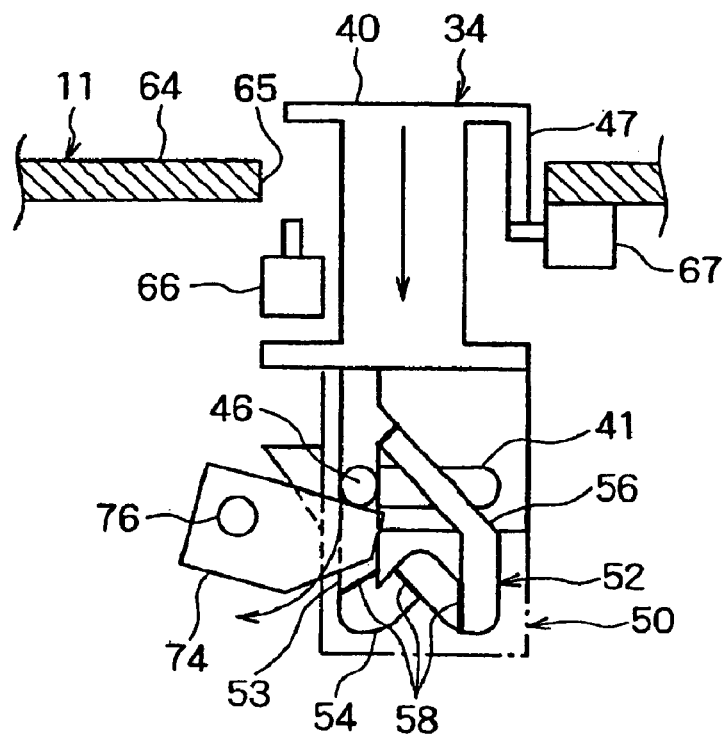
FIG. 11 is a diagram showing a second motion state of the motion direction changing lever during the operation process of the eject button executed to separate the notebook type PC from the docking station.
Figure 12:
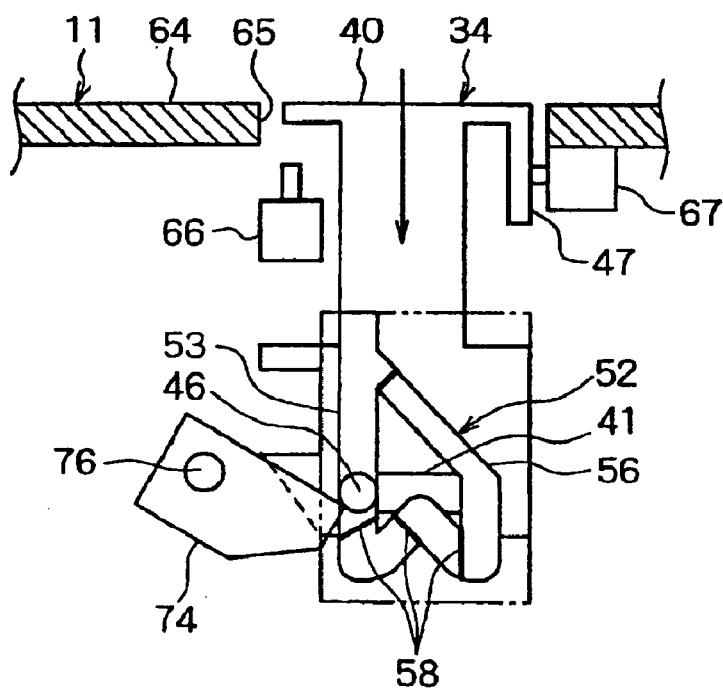
FIG. 12 is a diagram showing a third motion state of the motion direction changing lever during the operation process of the eject button executed to separate the notebook type PC from the docking station.
Figure 13:
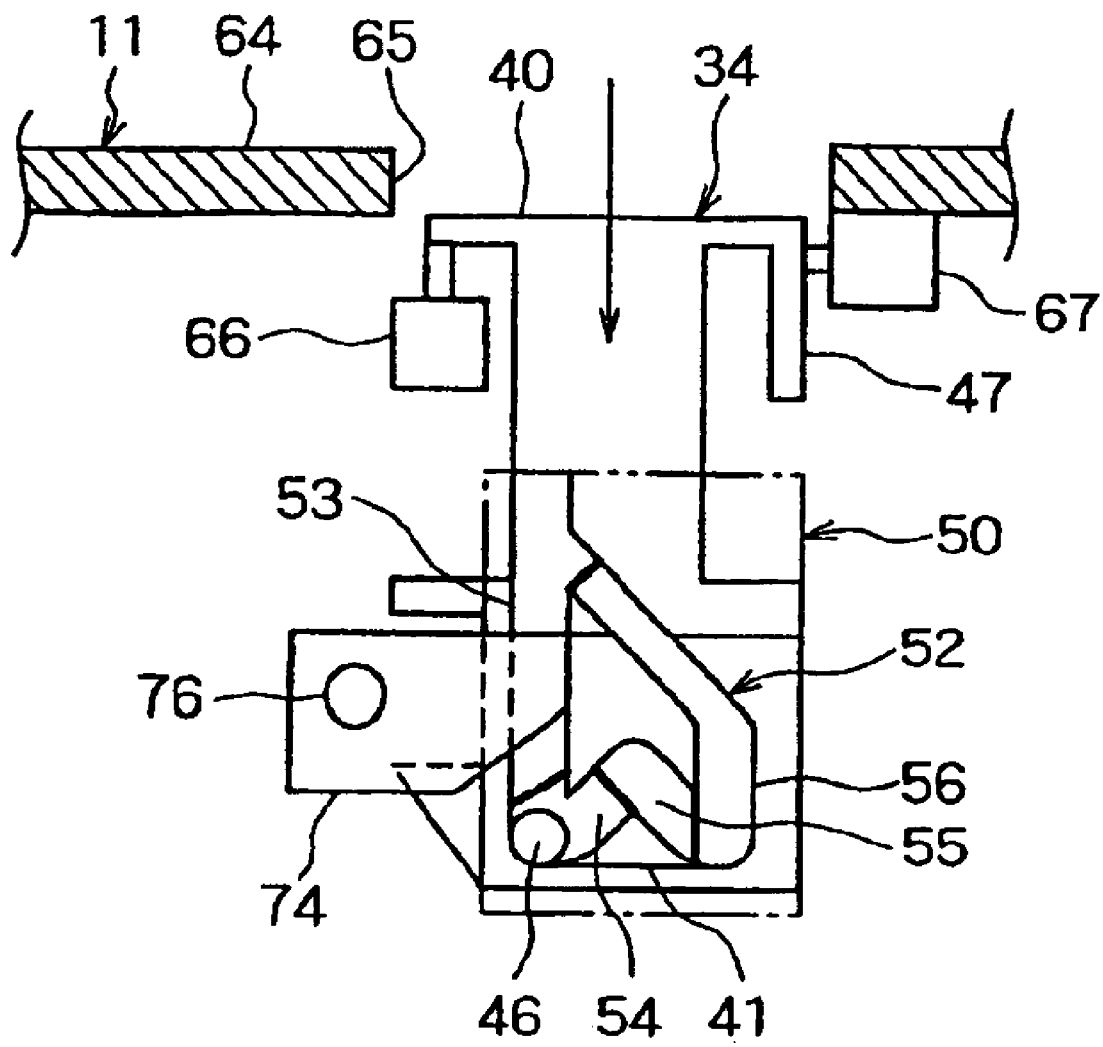
FIG. 13 is a diagram showing a fourth motion state of the motion direction changing lever during the operation process of the eject button executed to separate the notebook type PC from the docking station.
Figure 14:
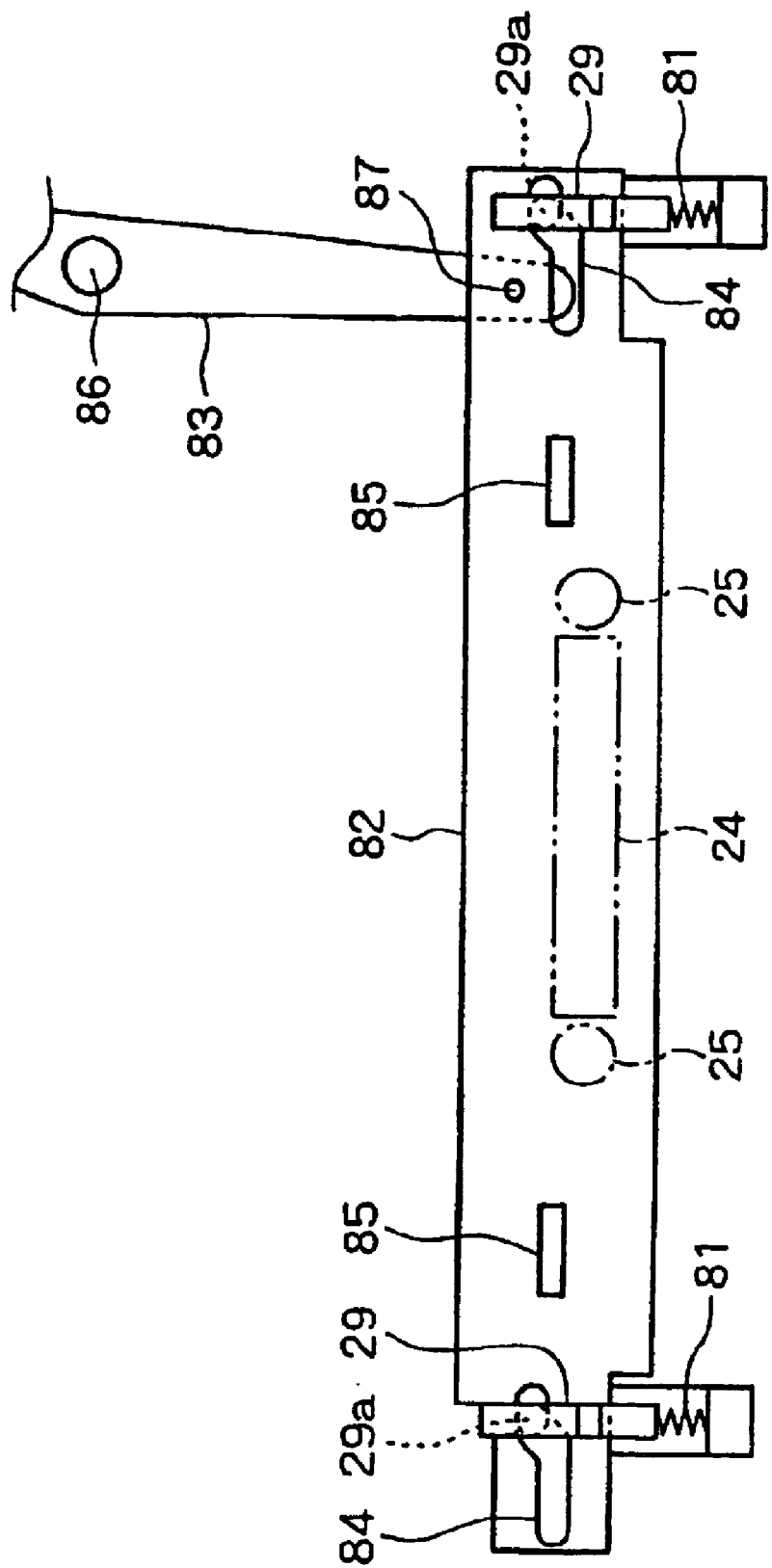
FIG. 14 is a diagram showing a docking mechanism that installs and ejects the notebook type PC on and from a table section using a locking hook.

As the eject button 34 is pushed in downward from its projected position, the pin 46 lowers through the suspending portion 53 (FIGS. 11, 12, and 13). The motion direction changing lever 74 abuts against the pin 46 and thus rotates clockwise (FIGS. 11 and 12). The rotation of the motion direction changing lever 74 is transmitted to a pivoting lever 83 (FIG. 14) via an intermediate intervening lever (not shown) arranged in the station main body 11 so as to pivot freely around an axis parallel with the displacing direction of the eject button 34, i.e. around a vertical axis. When the pin 46 climbs over the upper side edge of the motion direction changing lever 74 (FIG. 12), the pin 46 stops carrying the motion direction changing lever 74 downward. The motion direction changing lever 74 returns to its horizontal position owing to the urging force of the spring (FIG. 13).

On the other hand, during the motion process of the eject button 34 in FIGS. 5 to 8, described previously, the pin 46 advances through the downward inclining portion 55 and the bent rising portion 56 and does not abut against the motion direction changing lever 74. Consequently, the pin 46 does not force the motion direction changing lever 74 to pivot, during its rising process. Specifically, it is impossible that that end of the pivoting lever 83 (FIG. 14) which is closer to a control member 82 is displaced rightward in the docking station 10 to raise the ejecting member 27 or unlock the locking hook 29 as an operation required to eject the notebook type PC from the table section 12.

Figure 15C:
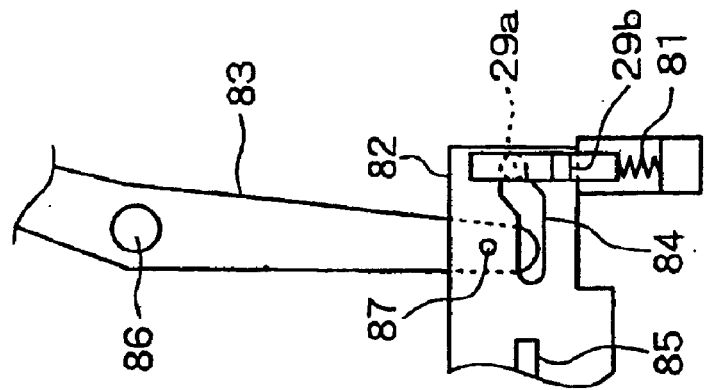
FIG. 15 is a diagram showing operations of the docking mechanism.

FIG. 14 shows a docking mechanism that installs and ejects the notebook type PC on and from the table section 12 using the locking hook 29. This mechanism includes a spring 81 that urges the locking hook 29 rearward, the control member 82 that controls the position of the locking hook 29 in the longitudinal direction, and the pivoting lever 87 which can pivot freely around the axis of the fulcrum 86, i.e. the vertically extending axis, and which is rotatively movably coupled to the control member 82 via a rotatively movable coupling point 87 to carry the control member 82 in the lateral direction. Furthermore, the intermediate intervening pivoting lever (not shown) is interposed between the motion direction changing lever 74 and the pivoting lever 83 in the displacement transmission path. The intermediate intervening pivoting lever can pivot freely around a vertical axis. The opposite ends of the intermediate intervening pivoting lever abut against a predetermined portion of the motion direction changing lever 74 and an end of the pivoting lever 83, respectively. The pivoting lever 83 is allowed to pivot around the fulcrum 86 on the basis of the pivotal displacement of the motion direction changing lever 74. Specifically, when the eject button 34 is pushed in from its projected position, shown in FIG. 10, to its sunken position, shown in FIG. 13, the motion direction changing lever 74 moves rotatively. The rotative movement of the motion direction changing lever 74 is transmitted to the pivoting lever 83 via the pivoting of the intermediate intervening pivoting lever. The control member 82 is thus displaced rightward. An end of the intermediate intervening pivoting lever can be simply abutted against an end of the pivoting lever 83 which is not shown in FIG. 14. Accordingly, the pivotal displacement of the motion direction changing lever 74 associated with its clockwise pivoting is transmitted to the control member 82 via the intermediate intervening pivoting lever. However, the pivoting force of the motion direction changing lever 74 is not transmitted to the pivoting lever 83 when the motion direction changing lever 74 pivots counterclockwise in FIG. 10. The control member 82 is held at a neutral position (FIG. 15(a)) in the lateral direction by a stopper (not shown) urged leftward by a predetermined urging force to restrict the pivoting of the previously described intermediate intervening pivoting lever (not shown). The stopper limiting the pivoting of the intermediate intervening pivoting lever can be freely pivotally displaced to disable its own stopper function. As described later, when the control member 82 is displaced to the position shown in FIG. 15(c), the stopper is pivotally displaced to disable its own stopper function.

The spring 81 has one end fixed to the station main body 11 and the other end fixed to the locking hook 29 to urge the locking hook 29 rearward. The control member 82 is provided with a cam groove 84 through which a cam follower 29a fixed to the bottom of the locking hook 29 is driven. The control member 82 has an inclined member 85 that engages with a roller provided at the bottom of the ejecting member 27 (FIG. 1). When the control member 82 moves rightward from the position shown in FIG. 14, the inclined member 85 raises, via the roller, the ejecting member 27 beyond the table section 12 in the vertical direction.

Figure 15B:
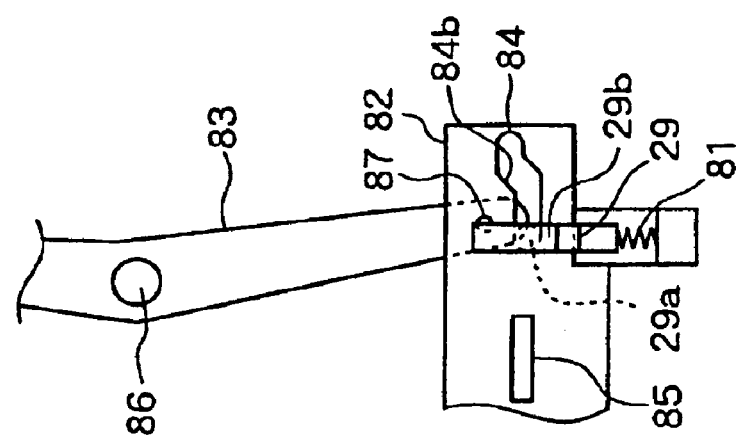
Figure 15A:
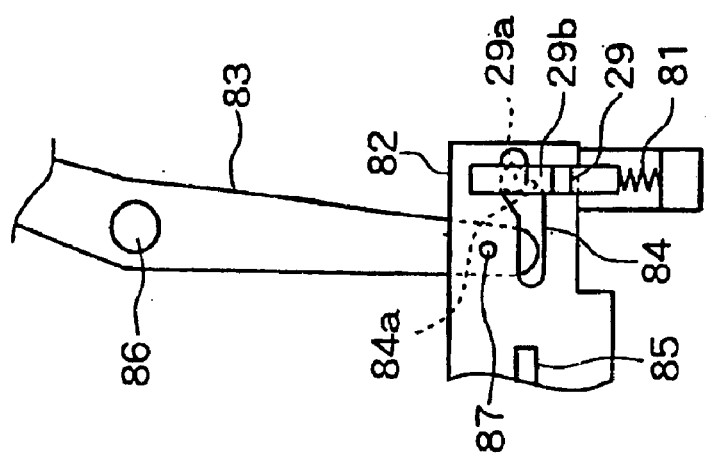

FIG. 15 shows operations of the docking mechanism. Before docking, as shown in FIG. 15(a), the position of the cam follower 29a with respect to the cam groove is intermediate between the lateral ends of the cam groove 84. In this state, the bottom surface of the notebook type PC approaches the table section 12 in order to install the notebook type PC on the table section 12. Then, a slant portion 29b of the locking hook 29 slides on the engaged portion of the notebook type PC to move the locking hook 29 forward. At this time, the cam follower 29a acts on a slant portion 84a of the cam groove 84 to slightly move the control member 82 and the pivoting lever 83. Once the locking hook 29 engages completely with the engaged portion of the notebook type PC, the urging force of the spring 81 moves the locking hook 29 rearward. This completes docking to allow the docking mechanism to return to the state shown in FIG. 15(a).

To eject the notebook type PC from the table section 12, the user pushes in the eject button 34 from its standard position to sunken position. Subsequently, the OS completes disconnecting the appropriate drivers to place the eject button 34 at its projected position (FIG. 10). Then, when the user pushes in the eject button 34 from its projected position to sunken position with his or her finger, the motion direction changing lever 74 pivots downward around the horizontal axis as described previously. Thus, the control member 82 moves rightward to bring the docking mechanism into the state shown in FIG. 15(b). In the meantime, the locking hook 29 moves forward in accordance with the movement of the control member 82 because of the action of the slant portion 84b of the cam groove 84 on the cam follower 29a. Consequently, the locking hook 29 is disengaged from the engaged portion of the notebook type PC. When the control member 82 further moves rightward, the inclined member 85 projects the ejecting member 27 (FIG. 1) from the table section 12 to push up the bottom surface of the notebook type PC, i.e. its coupled surface. Thus, the connector of the notebook type PC is disconnected from the connector 24 to complete undocking. When the user stops pushing the eject button 34, the docking mechanism returns to the state shown in FIG. 15(a).

When the theft prevention key 37 is rotated through 90° with the notebook type PC docked, the stopper limiting the pivoting of the previously described intermediate intervening pivoting lever (not shown) pivots to disable its own stopper function. Thus, the intermediate intervening pivoting lever is pivotally moved by a predetermined urging force to shift the docking mechanism from the state shown in FIG. 15(a) to the state shown in FIG. 15(c). Specifically, the pivoting lever 83 pivots clockwise around the fulcrum 86 to move the control member 82 leftward to place the cam follower 29a at the right end of the cam groove 84. That is, the docking state is locked. In this state, even if the eject button 34 is pushed to rotatively move the motion direction changing lever 74, the motion direction changing lever 74 does not abut the predetermined portion of the intermediate intervening pivoting lever. That is, the intermediate intervening pivoting lever cannot be allowed to pivot, and the locking hook 29 maintains a predetermined rear position. Consequently, the notebook type PC is not ejected from the table section 12. In this locked state, the proper user can pull out the theft prevention key 37. Therefore, a third person is prevented from ejecting the notebook type PC from the docking station 10 without using the theft preventing key 37.

The correspondences between the terms described in the section "Summary" and the terms used in the section "Embodiment" are shown below. The terms described in the section "Summary" as higher concepts include the terms used in the section "Embodiment", as lower concepts. In each row, the left terms are described in the section Summary", while the right terms are used in the section "Embodiment". One element described in the section "Embodiment" may belong to a plurality of higher conceptual elements described in the section "Summary". These specific examples are for exemplary purposes only and should not be considered as limiting upon the present invention.

| | |
|---|---|
| Separating apparatus (or separator): | ejecting member 27, locking hook 29, control member 82, pivoting lever 83, inclined member 85 |
| Control apparatus: | pin 46, circuiting cam groove 52, motion direction changing lever 74 |
| Ejecting operation member (a button): | Eject button 34 |
| Holding apparatus (or holder): | Lower stopper 43, solenoid type electromagnetic apparatus 70 |
| Driving apparatus (or actuator): | Solenoid type electromagnetic apparatus 70 |
| Sensing means: | Vertical switch 66, horizontal switch 67 |
| Locking apparatus (or locking member or button lock): | Lower stopper 43, solenoid type electromagnetic apparatus 70 |
| Electromagnetic apparatus: | Solenoid type electromagnetic apparatus 70 |
| Stopper: | Lower stopper 43 |
| Circuiting guide groove: | circuiting cam groove 52 |
| Motion mechanism: | ejecting member 27, locking hook 29, motion direction changing lever 74, control member 82, pivoting lever 83, inclined member 85 |
| Displacement transmitting mechanism (or linkage): | motion direction changing lever 74 |

According to the present invention, it is possible to use a single ejecting o operation member to give an instruction on disconnection of appropriate drivers to the OS of the portable computer for ejection and to eject the portable computer from the docking station. In this case, the user is clearly informed that an operation of ejecting the portable computer from the docking station is enabled.

In the drawings and specifications there has been set forth a preferred embodiment of the invention and, although specific terms are used, the description thus given uses terminology in a generic and descriptive sense only and not for purposes of limitation.

We claim as our invention:

1. Apparatus comprising:
   a docking station to which a computer can be releasably attached;
   a button which protrudes through a surface of said docking station and which is operated by a user;
   a separator which is secured to said docking station and which unlocks the computer from said docking station;
   a holder which is operatively coupled to said button and which maintains said button at a first position while the computer is installed in said docking station;
   a sensor unit which is operatively coupled to said button and which detects when the user's operation causes said button to displace from the first position to a second position and which, on the basis of the detection, directs the computer to disable a driver which drives an external device coupled to said docking station;

an actuator which is operatively coupled to said button and which drives said button to a third position after the computer has notified the docking station that the computer has finished the disablement of the driver; and a controller which is operatively coupled to said separator and which activates said separator to unlock the computer in response to the user's operation which causes said button to move from the third position.

2. Apparatus of claim 1 wherein said button is of a type operated using the operator's finger.

3. Apparatus of claim 1 wherein:

the positions of said button are defined in the order of the second, first, and third positions in a direction at which said button is displaced, the docking station further includes a spring that urges said button from the second position to the third position and a button lock that releasably locks said button at the first position; and said holder includes said spring and said button lock.

4. Apparatus of claim 1 wherein:

said separator is mechanical and moves in accordance with a transmitted mechanical displacement to separate the computer from said docking station; and said controller includes a linkage that transmits, to said separator, the mechanical movement of said button from the third position to the second position.

5. Apparatus of claim 2 wherein:

at the first position, a finger operation surface of said button is generally flush with a predetermined outer surface portion of said docking station;

at the second position, the finger operation surface of said button is sunken into said docking station with respect to the predetermined outer surface of said docking station; and at the third position, the finger operation surface of said button projects outward from the predetermined outer surface of said docking station.

6. Apparatus of claim 3 wherein said controller activates said separator when the user performs an operation to displace said button from the third position to the second position.

7. Apparatus of claim 3 wherein said button lock includes a plunger which is electromagnetically switched between a projected position and a non-projected position and a stopper formed in said button and abutting against said plunger projecting in the displacing direction of said button, and which holds said button at the first position against an urging force of said spring.

8. Apparatus of claim 4, wherein said controller further includes a pin which is displaced integrally with said button in the displacing direction of said button and which is displaced relative to said button in a first direction normal to the displacing direction of said button, and a circuiting guide groove that guides said pin in the first direction so that during a movement process in which said button is operated by the user to move from the third position to the second position, said pin carries a predetermined pivoting portion of said linkage to transmit the displacement of said pin to said linkage, and during other movement processes, said pin leaves the predetermined pivoting portion of said linkage so as not to transmit the displacement of said pin to said linkage.

9. Apparatus of claim 7 wherein said plunger is positioned at the non-projected position at which said plunger does not abut against said stopper when said actuator drives said button to the third position, and said actuator includes said plunger and said spring.

* * * * *